W. SONNBERG.
BALL BEARING.
APPLICATION FILED JULY 31, 1908.

1,000,044.

Patented Aug. 8, 1911.

WITNESSES:
Fred White

INVENTOR:
Wilhelm Sonnberg
By Attorneys,

UNITED STATES PATENT OFFICE.

WILHELM SONNBERG, OF BERLIN, GERMANY, ASSIGNOR TO DEUTSCHE WAFFEN-UND MUNITIONSFABRIKEN, OF BERLIN, GERMANY.

BALL-BEARING.

1,000,044.    Specification of Letters Patent.    Patented Aug. 8, 1911.

Application filed July 31, 1908. Serial No. 446,272.

*To all whom it may concern:*

Be it known that I, WILHELM SONNBERG, engineer, a subject of the King of Prussia, residing at 43/44 Dorotheenstrasse, Berlin, in the Kingdom of Prussia, Germany, have invented certain new and useful Improvements Relating to Ball-Bearings, of which the following is a full, clear, and exact description.

The present invention relates to the construction of ball bearings with two or more rows of balls and the object of the invention is to construct a bearing in which on the one hand for obtaining a very narrow bearing the rows of balls and consequently the grooves are arranged abnormally near to each other and on the other hand a greater number of balls can be inserted without necessitating a filling opening passing through both ball races. Consequently with the present bearing forming the subject of this invention the arrangement is such that only one of the grooves or races is broken whereas the other groove as it has no filling opening remains unbroken. The insertion of the balls in both races corresponding to this arrangement is effected by first introducing the same into the one unbroken groove or race by eccentrically displacing the rings and then after having readjusted the rings concentrically to each other and having distributed the balls inserted at equal distances apart, the balls of the second row or set are inserted through the filling opening of the second race but only as many balls as can be inserted in a staggered or intermediate position between the spaces or gaps of the first row or set of balls. In connection with this bearing is employed a cage so constructed that it can be inserted from the side after having introduced and equally distributed the first row or set of balls and which cage for this purpose is provided on both sides with open recesses or pockets so that the cage can be pushed with the pockets of the one side over or so as to embrace the balls of the first row or set already situated in the bearing while by rotating the cage the pockets of the other side can be brought one after the other in front of the filling opening and thus filled with the balls of the second row or set. After this operation the pockets are closed by bending over the lugs.

Figure 1:
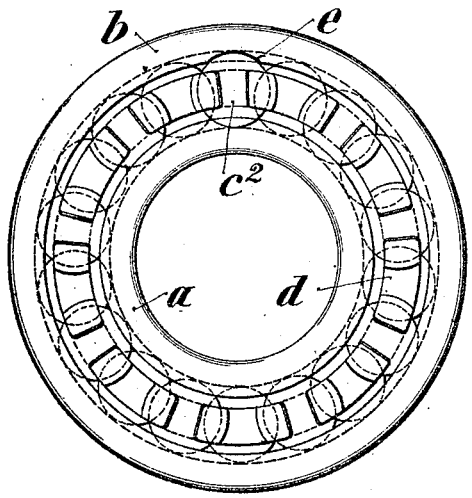
Figure 2:
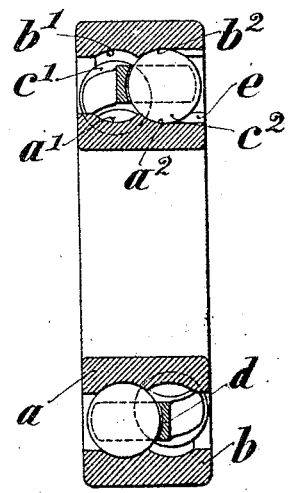
Figure 3:
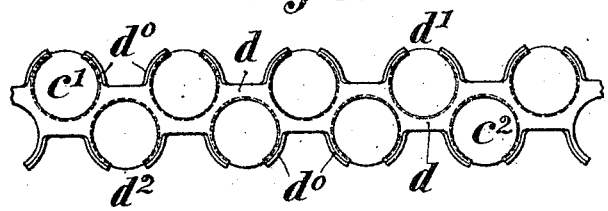

In the accompanying drawings: Figure 1 is a front elevation of a double row bearing constructed according to the present invention, Fig. 2 is a vertical transverse section thereof and Fig. 3 is a plan view of a portion of the cage opened out or developed and with the balls inserted in position.

The double row bearing illustrated in the drawings consists of rings $a$ and $b$ having grooves or ball races $a^1$ $a^2$ and $b^1$ $b^2$ situated relatively near to each other so that their centers are only separated from each other by about one half of or slightly more than the diameter of a ball. The grooves or races $a^1$ $b^1$ for the left hand set of balls $c^1$ are unbroken that is to say they have no filling opening and with a bearing of the dimensions shown in the drawing nine balls can be inserted, at the same time retaining the advantages resulting from the construction herein described. The grooves $a^2$ $b^2$ for the second set of balls are provided with a filling opening passing to the outside and in the present case the filling opening consists of two grooves or recesses $e$ one arranged in the outer ring and one in the inner ring and reaching to or almost to the race or groove for the balls. The mode of filling this arrangement has been described in the preamble.

With regard to the kind of cage employed it may be remarked that it consists only of a single cast or stamped body $d$ with pockets $d^1$ and $d^2$ arranged on both sides, said pockets being staggered or arranged in intermediate positions corresponding to those of the balls between the race rings $a$ $b$ and said pockets can be closed by bending over the lugs or tongues $d^0$. The method of inserting the cage into the bearing has also been described in the preamble and it may merely be further remarked that the cage is pushed over the balls $c^1$ with the pockets $d^1$ open after the balls of the first row have been inserted and distributed equidistant from each other. The pockets $d^2$ are also open and are arranged between the grooves $a^2$ $b^2$, the balls are inserted into the latter through the filling orifice e, the cage being rotated so as to bring the pockets successively in front of the opening e thereby permitting the balls to be inserted into the pockets. When this has been effected the pockets are closed by bending over the lugs $d^a$.

The double row bearing constructed according to the present invention is only slightly broader than a single row bearing but possesses at least as many balls and in addition thereto a cage which counteracts the injurious effect of the ball pressure.

Notwithstanding that the bearing has two rows or sets of balls only one filling opening need be provided so that the one groove or race remains quite unbroken while the balls are prevented from falling out of the filling opening by means of the cage.

The cage employed according to the present invention has the advantage of great simplicity and at the same time absolute security, as the closed pockets prevent any accidental variation in the spacing of the balls even under pressure which is not the case with the known strip shaped intermediary cages for double grooved bearings. As the cage is so constructed after having arranged the balls at an equal distance from each other it can be inserted from the side into the unbroken track or race special arrangements such as intermediary grooves for adjusting the cage can be dispensed with.

What I claim as my invention and desire to secure by patent is:

1. A double row ball bearing having two recessed tracks or races and a filling opening leading into one of said races, said races being formed in an integral part of the bearing and the walls of the bearing on either side of the races being unbroken except for said filling opening, whereby the balls are supported in and embraced on either side of the races by the walls of the bearing, and a cage adapted to be inserted axially into the bearing, having a middle body portion and means for holding both rows of balls on each side of said body portion, said means embracing the respective balls to a greater extent than half their circumference and preventing circumferential displacement of the balls relative to one another.

2. A double row ball bearing having two recessed tracks or races and a filling opening leading into one of said races, the walls of the bearing on either side of the races being unbroken except for said filling opening, whereby the balls are supported in and embraced on either side of the races by the walls of the bearing, and a cage adapted to be inserted axially into the bearing, having a middle body portion and means for holding both rows of balls on each side of said body portion, said means embracing the respective balls to a greater extent than half their circumference and preventing circumferential displacement of the balls relative to one another.

3. A double row narrow ball bearing having two tracks or races, one of which is provided with a lateral filling opening, and the other of which is unbroken, and a cage adapted to be inserted axially into the bearing and having means for holding both rows of balls in staggered relation, said cage having a middle body portion, having pockets formed on each side thereof, and lugs near said pockets.

4. A ball bearing having two rows of balls, and having bearing rings formed with two sets of recessed ball grooves lying close together and a filling opening leading into one of said grooves, the walls of the bearing on either side of the grooves being unbroken except for said filling opening, whereby the balls are supported in and embraced on either side of the groove by the walls of the bearing, and an integral cage for both said sets of balls embracing the balls to a greater extent than half their circumference.

5. In a ball bearing having two rows of balls, a cage comprising a ring-shaped body having pockets on each side thereof, those of one side adapted to engage one row of balls, and those of the other side adapted to engage the other row, said pockets being staggered, and lugs at each pocket bent to engage the balls.

6. In a ball bearing having two rows of balls, a cage comprising a ring-shaped body having a series of pairs of narrow malleable lugs on each side thereof, adapted to be bent around the balls of the bearing, those of one side adapted to engage one row of balls, and those of the other side adapted to engage the other row, said lugs being staggered.

7. In a ball bearing having two rows of balls, a cage comprising a ring-shaped body having a series of pockets arranged on either side thereof in staggered relation, a series of pairs of narrow malleable lugs on each side thereof adapted to be bent around the balls of the bearing, those of one side adapted to engage one row of balls, and those of the other side adapted to engage the other row, said lugs being staggered.

8. In a ball bearing having two rows of balls, a cage comprising a ring-shaped body having a series of pockets arranged on either side thereof in staggered relation, the bottoms of the recesses on the two sides of the ring extending beyond the medial line of the cage, whereby the rows of balls, when contained in the cage are closer together than the distance between the centers of the balls, a series of pairs of narrow malleable lugs on each side thereof adapted to be bent around the balls of the bearing, those of one side adapted to engage one row of balls, and those of the other side adapted to engage the other row, said lugs being staggered.

In witness whereof I have hereunto signed my name in the presence of two subscribing witnesses.

WILHELM SONNBERG.

Witnesses:
 ROBERT MICHALSKI,
 HENRY HASPER.